United States Patent
Kim et al.

(10) Patent No.: US 12,539,687 B2
(45) Date of Patent: Feb. 3, 2026

(54) CONSTRAINED-TYPE VIBRATION-DAMPING METAL SHEET HAVING FOAM PORES AND METHOD FOR MANUFACTURING SAME

(71) Applicant: POSCO Co., Ltd, Pohang-si (KR)

(72) Inventors: Jin-Tae Kim, Gwangyang-si (KR);
Yang-Ho Choi, Gwangyang-si (KR);
Ha-Na Choi, Gwangyang-si (KR);
Dae-Gyu Kang, Incheon (KR)

(73) Assignee: POSCO CO., LTD, Pohang-si (KR)

( * ) Notice: Subject to any disclaimer, the term of this patent is extended or adjusted under 35 U.S.C. 154(b) by 227 days.

(21) Appl. No.: 18/025,757

(22) PCT Filed: Sep. 13, 2021

(86) PCT No.: PCT/KR2021/012422
§ 371 (c)(1),
(2) Date: Mar. 10, 2023

(87) PCT Pub. No.: WO2022/065773
PCT Pub. Date: Mar. 31, 2022

(65) Prior Publication Data
US 2023/0347623 A1    Nov. 2, 2023

(30) Foreign Application Priority Data

Sep. 25, 2020   (KR) ........................ 10-2020-0124880

(51) Int. Cl.
*B32B 15/04*    (2006.01)
*B32B 5/20*     (2006.01)
(Continued)

(52) U.S. Cl.
CPC .............. *B32B 15/046* (2013.01); *B32B 5/20* (2013.01); *B32B 15/085* (2013.01); *B32B 15/18* (2013.01);
(Continued)

(58) Field of Classification Search
None
See application file for complete search history.

(56) References Cited

U.S. PATENT DOCUMENTS 4,062,997 A * 12/1977 Hotta .................... B32B 15/085
                                                          413/18
2012/0315463 A1   12/2012 Miura et al.
2014/0284086 A1 *  9/2014 Iwase ..................... C08J 9/0061
                                                          29/829

FOREIGN PATENT DOCUMENTS

CN         101253233 A      8/2008
CN         102690459 A *    9/2012
(Continued)

OTHER PUBLICATIONS

Takahashi, N., Composite Board, Apr. 30, 2009, machine translation of JP2009-090522 (Year: 2009).*
(Continued)

*Primary Examiner* — Chinessa T. Golden
(74) *Attorney, Agent, or Firm* — Morgan Lewis & Bockius LLP

(57) ABSTRACT

Provided are a constrained-type vibration-damping metal sheet having foam pores and a method for manufacturing same. The constrained-type vibration-damping metal sheet of the present invention comprises: a lower metal sheet; a foam resin film bonded to the lower metal sheet; and an upper metal sheet bonded to the foam resin film, wherein the foam resin film has foam pores comprising, by wt % of itself, 85-95% of a thermoplastic polyethylene resin having a number average molecular weight of 8000-12000, 0.1-1% of stearic acid, 1-5% of a styrene-ethylene-butadiene-styrene (SEBS) resin, 0.5-5% of a foaming agent, 1-4% of a dicumyl peroxide crosslinking agent, and 0.5-2% of ZnO foaming aid.

4 Claims, 3 Drawing Sheets

(51) Int. Cl.
  *B32B 15/085* (2006.01)
  *B32B 15/18* (2006.01)
  *B32B 15/20* (2006.01)
  *B32B 37/10* (2006.01)

(52) U.S. Cl.
  CPC .............. *B32B 15/20* (2013.01); *B32B 37/10* (2013.01); *B32B 2305/022* (2013.01); *B32B 2307/102* (2013.01); *B32B 2307/7376* (2023.05)

(56) References Cited

FOREIGN PATENT DOCUMENTS

| | | | |
|---|---|---|---|
| CN | 102815050 A | | 12/2012 |
| CN | 110655702 A | | 1/2020 |
| JP | S51-093770 A | | 8/1976 |
| JP | S56-159160 A | | 12/1981 |
| JP | S59-152847 A | | 8/1984 |
| JP | H06-316017 A | | 11/1994 |
| JP | 2957303 B2 | | 10/1999 |
| JP | 2000-225664 A | | 8/2000 |
| JP | 2007-162749 A | | 6/2007 |
| JP | 2009090522 A | * | 4/2009 |
| JP | 2017-205886 A | | 11/2017 |
| KR | 10-2005-0045048 A | | 5/2005 |
| KR | 20050045048 A | * | 5/2005 |
| KR | 10-2008-0056829 A | | 6/2008 |
| KR | 10-2010-0058789 A | | 6/2010 |
| KR | 20100058789 | * | 6/2010 |
| WO | 2007/029924 A1 | | 3/2007 |
| WO | 2010/062113 A2 | | 6/2010 |

OTHER PUBLICATIONS

Gong, W., High Resilience Chemical Crosslinked Polyethylene Foam Material, Sep. 26, 2012, machine translation of CN 102690459 (Year: 2012).*
Jo, Composition for Shock Absorbing Synthetic Resin Foam, May 17, 2005, machine translation of KR 20050045048 (Year: 2005).*
Lee, S., Heat Expandable Flame Retardant Polyolefin Resin, Jun. 4, 2010, machine translation of KR 2010-0058789 (Year: 2010).*
Office Action issued Mar. 26, 2024 for Japanese Patent Application No. 2023-516577.
Office Action dated Sep. 27, 2024, issued in corresponding Chinese Patent Application No. 202180066147.9.
International Search Report dated Dec. 27, 2021 issued in International Patent Application No. PCT/KR2021/012422 (with English translation).
Holden et al., "Thermoplastic Elastomers", Beijing: Chemical Industry Press, ISBN 7-5025-2714-1, Mar. 2000, pp. 579-581 with an English translation.
Li, "Modern Research on the Processing and Application of Packaging Materials", Beijing: China Commercial Press, ISBN 978-7-5044-9990-5, Jul. 2017, pp. 83-84 with an English translation.
Office Action dated Apr. 27, 2025, issued in corresponding Chinese Patent Application No. 202180066147.9 with an English translation.
Office Action issued in corresponding Chinese Patent Application No. 202180066147.9 dated Dec. 19, 2025.
Yang Songchao, Editor, "Polymer material molding and processing", 3rd Edition, Beijing, CN, China Light Industry Press, May 2013, 6 pages.

* cited by examiner

Block Diagram of Experimental Set-up using a Two-Channel Spectrum
Analyzer and Random Noise Excitation Signal

CONSTRAINED-TYPE VIBRATION-DAMPING METAL SHEET HAVING FOAM PORES AND METHOD FOR MANUFACTURING SAME

CROSS-REFERENCE OF RELATED APPLICATIONS

This application is the U.S. National Phase under 35 U.S.C. § 371 of International Patent Application No. PCT/KR2021/012422, filed on Sep. 13, 2021, which in turn claims the benefit of Korean Application No. 10-2020-0124880, filed on Sep. 25, 2020, the entire disclosures of which applications are incorporated by reference herein.

TECHNICAL FIELD

The present disclosure relates to manufacturing of a constrained-type vibration-damping metal sheet having foamed pores, and more particularly, to a constrained-type vibration-damping metal sheet having foamed pores and a method of manufacturing the same, in which a foamed resin film is bonded between metal plates, then foamed and cooled to have vibrations control and noise blocking effects.

BACKGROUND ART

In general, damping steel sheets are largely classified as a constrained-type composite steel sheet manufactured by laminating resin between two steel sheets and a non-constrained type vibration-damping steel sheet in which resin is coated or laminated on a single sheet of steel to serve to block noise or vibrations. In the case of the unconstrained type, the manufacturing process is simple with a two-layer structure, but the damping effect is relatively low compared to the constrained type, and the performance as a damping steel sheet is inferior, and thus, most of the damping steel sheet has a structure of the constrained type.

For example, although there is a difference in the form of the damping effect between the constrained type and the unconstrained type, in the case of the constrained type damping steel plate, the external vibrations or noise energy applied to the steel plate is absorbed as thermal energy by the shear deformation of the resin laminated between the steel plates, serving to reduce vibrations and noise. On the other hand, in the case of the non-constrained damping steel plate, external vibrations or noise energy applied to the steel plate is absorbed as thermal energy by the elastic deformation of the resin coated on the steel plate, thereby reducing vibrations or noise.

These vibration damping steel plates may be used in a wide variety of fields, for example, used for outer panels of household appliances that generate a lot of noise, such as refrigerators, washing machines, and air purifiers, automotive parts such as oil pans in engine parts, which are the main cause of automobile noise, dash panels and the like, precision equipment, construction materials, etc.

However, in the conventional damping steel sheet, a thermoplastic polymer resin such as polyethylene is inserted into the steel sheet in the form of a sandwich panel or a liquid polymer resin is applied to implement vibration-damping performance. That is, typically, it is known that polymer resins such as polyester (Japanese Patent Laid-open No. 51-93770), polyamide (Japanese Patent Laid-Open No. 56-159160), ethylene/α-olefin and cross-linked polyolefin (Japanese Patent Laid-Open No. 59-152847), and the like are used to secure vibration damping performance, but there was a limit to the application to the above-mentioned household appliances, automobiles or the like, generating a lot of noise.

SUMMARY OF INVENTION

Technical Problem

An aspect of the present disclosure is to provide a constrained-type vibration-damping metal sheet in which vibrations/noise of a product may be significantly reduced, by not only simply using only the viscoelastic properties of polymer resins to improve vibration-damping performance, but utilizing the effect of foam pores, to implement vibration-damping and sound insulation performance through the viscoelastic properties of polymer resin and the vibrations/noise blocking effect of foam pores.

In addition, the technical subjects to be achieved in the present disclosure are not limited to the technical problems mentioned above, and other technical problems not mentioned will be clearly understood by those skilled in the art from the description below.

Solution to Problem

According to an aspect of the present disclosure, a constrained-type vibration-damping metal sheet having foam pores includes a lower metal plate; a foamed resin film bonded to the lower metal plate; and an upper metal plate bonded to the foamed resin film, wherein the foamed resin film includes, by wt % of itself, 85-95% of a thermoplastic polyethylene resin having a number average molecular weight of 8000-12000, 0.1-1% of stearic acid, 1-5% of a styrene-ethylene-butadiene-styrene (SEBS) resin, 0.5-5% of a foaming agent, 1-4% of a dicumyl peroxide crosslinking agent, and 0.5-2% of ZnO foaming aid.

According to another aspect of the present disclosure, a method of manufacturing a constrained-type vibration-damping metal sheet having foam pores includes preparing a foamed resin film having the foamed resin composition as described above; laminating the prepared foamed resin film between two metal plates and then passing a laminate through a first heating zone maintained at a temperature of 130 to 150° C., to be roll-pressed and bonded; forming foam pores in the foamed resin film by foaming a foaming agent by passing the roll-bonded laminate through a second heating zone maintained at a temperature of 150 to 190° C.; and cooling the laminate in which the foam pores are formed to room temperature.

The foaming agent may be an azodicarbonamide-based powder foaming agent.

A thickness of the foamed resin film may range from 50 to 250 μm.

The metal plate may be one selected from a cold-rolled steel sheet, a hot-rolled steel sheet, a galvanized steel sheet, a zinc alloy coated steel sheet, a stainless steel sheet, and an aluminum sheet.

In the continuous manufacturing process, it is preferable to limit a line speed to 0.5 to 5 m/min.

Advantageous Effects of Invention

The present disclosure configured as described above may effectively provide a constrained-type vibration-damping metal sheet having foam pores to have vibrations control and noise blocking effects by bonding a foamed resin film between metal plates and then foaming and cooling the foaming agent.

BEST MODE FOR INVENTION

Figure 1:
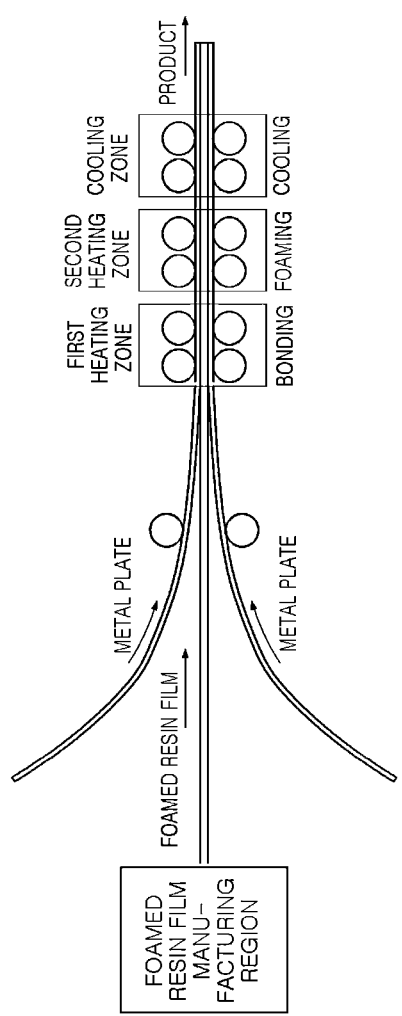
FIG. 1 is a manufacturing process diagram of a constrained-type vibration-damping steel sheet according to an embodiment of the present disclosure.

Hereinafter, the present disclosure will be described.

The present disclosure is a technology for improving the damping performance of a metal plate by applying foamed pores to a coating film. In detail, it is characterized in that the damping performance of the metal plate is improved by exposing the foam pores to a noise/vibrations source so that the noise/vibrations generated are blocked from the pores.

The constrained-type vibration-damping metal sheet of the present disclosure includes a lower metal plate; a foamed resin film bonded to the lower metal plate; and an upper metal plate bonded to the foamed resin film. The foamed resin film includes, by wt % of itself, 85-95% of a thermoplastic polyethylene resin having a number average molecular weight of 8000-12000, 0.1-1% of stearic acid, 1-5% of styrene-ethylene-butadiene-styrene (SEES) resin, 0.5-5% of a foaming agent, 1-4% of an oxide crosslinking agent, and 0.5-2% of ZnO foaming aid.

First, the constrained-type vibration-damping steel sheet of the present disclosure includes upper and lower metal plates to be bonded to both sides of the foamed resin film. In the present disclosure, each of the upper and lower metal plates may be one selected from a cold-rolled steel plate, a hot-rolled steel plate, a galvanized steel plate, a zinc alloy coated steel plate, a stainless steel plate, and an aluminum plate, and each of the metal plates may have a thickness of 0.2 to 2.0 mm.

And, the damping metal sheet of the present disclosure includes a foamed resin film formed between the two metal plates. The foamed resin film, in terms of its own weight %, contains a thermoplastic polyethylene resin having a number average molecular weight of 8000 to 12000: 85 to 95%, stearic acid: 0.1 to 1%, and styrene-ethylene-butadiene-styrene (SEBS) resin: 1 to 5%, foaming agent: 0.5 to 5%, oxide crosslinking agent: 1 to 4%, and foaming aid ZnO: 0.5 to 2%. Hereinafter, "%" refers to "by weight" unless otherwise indicated.

The foamed resin film of the present disclosure contains 85 to 95% of a thermoplastic polyethylene resin having a number average molecular weight of 8000 to 12000 in terms of its own weight %. If the number average molecular weight is less than 8000, the film is too soft and it is difficult to maintain strength as a damping steel sheet. On the other hand, if the number average molecular weight exceeds 12000, it is too hard and it may be difficult to form foamed pores. In addition, the foamed resin film of the present disclosure includes polyethylene resin in the range of 85 to 95%, and if the content is out of this range, the proper amount of other additives may be insufficient, which may cause difficulties in serving as a damping steel sheet.

In addition, the foamed resin film of the present disclosure contains stearic acid in an amount of 0.1 to 1% to improve melt workability of polyethylene when the polyethylene resin is melted. If stearic acid is added in an amount less than 0.1%, it does not help melt workability of the polyethylene resin, whereas if it exceeds 1%, the physical properties of the polyethylene film may be deteriorated.

In addition, the foamed resin film of the present disclosure includes styrene-ethylene-butadiene-styrene (SEBS) resin in an amount of 11 to 5% to improve adhesion between the upper and lower metal plates and the polyethylene film. If the content of the SEBS resin is less than 1%, the effect on improving adhesion is small, whereas if it exceeds 5%, the softness of the film is high and economic efficiency may be unfavorable.

In addition, the foamed resin film of the present disclosure includes a foaming agent for forming pores in the range of 0.1 to 5%. If the content of the foaming agent is less than 0.1%, the amount of gas generated is insufficient, and if it exceeds 5%, the foaming efficiency is good due to the increase in the amount of generated gas, but it may be difficult to maintain the strength as a damping steel sheet.

In the present disclosure, azodicarboneamide, which is a powder foaming agent as illustrated in Table 1 below, may be used as the foaming agent.

Alternatively, a capsule foaming agent containing a foaming agent in a thermoplastic acrylonitrile-based resin cell structure as illustrated in Table 2 below may be used as the foaming agent.

TABLE 1

| Item | Unit | Properties |
| --- | --- | --- |
| Appearance | | Yellow Powder |
| Decomposition Temperature | ° C. | 200-210 |

TABLE 2

| Item | Unit | Properties |
| --- | --- | --- |
| Appearance | | White Powder |
| Decomposition Temperature | ° C. | 160-180 |

In addition, the foamed resin film of the present disclosure includes a crosslinking agent to maintain the shape of foam pores generated in the plastic resin, and preferably dicumylperoxide as illustrated in Table 3 below is used. At this time, the content to be added is preferably limited to 1 to 4%. If the content is less than 1%, the role as a crosslinking agent is difficult due to the insufficient amount added, whereas if it exceeds 4%, a crosslinked portion occurs before foam cells are formed due to an increase in crosslinking degree, resulting in a decrease in foaming rate.

TABLE 3

| Structure | $[C_6H_5C(CH_3)_2]_2O_2$ |
| --- | --- |
| Molecular Weight | 270.37 |
| Melting Point | 39-41° C. |

In addition, the foamed resin film of the present disclosure includes 0.5 to 2% of ZnO as a foaming aid.

In the manufacture of damping steel sheets, if foaming is continued for a long time at a temperature of 200° C. or higher for foaming in the foamed resin film, the stiffness of the metal sheet material may change or the polymer resin may be damaged by heat, which is economically disadvantageous, and therefore, it is necessary to lower the foaming temperature as much as possible. In general, the decomposition temperature of azodicarbonamide, a foaming agent, is 205° C., and when ZnO is added, since the foaming agent decomposes at 150 to 170° C., the loss of processing temperature may be prevented and the crosslinking role of the crosslinking agent may be improved.

Therefore, the foamed resin film of the present disclosure contains 0.5 to 2% of ZnO as a foaming aid to lower the decomposition temperature of the foaming agent. If the added amount is less than 0.5%, the role of lowering the decomposition temperature is insufficient, and if exceeds 2%, the added ZnO may become an obstacle to foam pore formation.

Next, a method of manufacturing the constrained-type vibration-damping metal sheet of the present disclosure will be described.

A method for manufacturing a constrained-type vibration-damping steel sheet of the present disclosure includes an operation of preparing a foamed resin film having the foamed resin composition as described above; an operation of laminating the prepared foamed resin film between two metal plates and then passing the laminate through a first heating zone maintained at a temperature of 130 to 150° C. to roll press the laminate to bond the same; an operation of forming foam pores in the foamed resin film by foaming a foaming agent by passing the roll-bonded laminate through a second heating zone maintained at a temperature of 150 to 190° C.; and an operation of cooling the laminate in which the foamed pores are formed to room temperature.

FIG. 1 is a manufacturing process diagram of a constrained-type vibration-damping steel sheet according to an embodiment of the present disclosure.

As illustrated in FIG. 1, the method of manufacturing the constrained-type vibration-damping metal sheet of the present disclosure schematically includes a foaming film manufacturing process, a film bonding process, a film foaming process, and a cooling compression process sequentially.

First, in the present disclosure, a composition consisting of a mixture of a foaming material and a polymer resin having the above-described composition and is uniformly mixed in a mixer in a melting method by heat, and is then formed into a film through an extruder.

In detail, in the mixing order of these compositions, polyethylene resin having a number average molecular weight of 8000 to 12000 is first melted at 140° C., and stearic acid is mixed therein in the range of 0.1 to 1% by weight. Then, 1-5% of Styrene-ethylene-butadiene-styrene (SEBS) resin is mixed. Subsequently, after mixing 0.1 to 10% of a foaming agent and 0.5 to 2% of ZnO as a foaming aid, finally, dicumyl peroxide is added in a range of 1 to 4% as a crosslinking agent and mixed uniformly to prepare a foamed resin composition. In addition, a film is prepared from the blended resin composition through a t-die of an extruder, and foaming should not be performed during film production.

In the present disclosure, it is preferable to control the thickness of the film in the range of 50 to 250 μm. If the thickness of the film is less than 50 μm, the film thickness is too thin and the damping ability of the damping steel sheet is insufficient, and if exceeding 250 μm, the damping ability is excellent, but the film thickness is too thick and the workability may be poor.

Subsequently, in the present disclosure, after the prepared foamed resin film is laminated between two metal plates, the laminate is bonded by roll pressing while passing through a first heating zone maintained at a temperature of 130 to 150° C. That is, after the film is inserted between the metal plate and the metal, the metal and the foamed film are adhered to each other while being compressed by roll pressing in the first heating zone at a temperature higher than the melting point of the polymer resin.

At this time, the present disclosure uses a continuous manufacturing process in which the prepared foamed resin film is inserted between metal plates and passes through the first heating zone of 130 to 150° C., which is the melting point or more of polyethylene resin, thereby bonding through roll pressing.

Further, in the present disclosure, the foaming agent is foamed by passing the roll-bonded laminate through a second heating zone maintained at a temperature of 150 to 190° C. to form foamed pores in the foamed resin film.

That is, when the roll-bonded laminate passes through the second heating zone of 150 to 190° C., the foaming agent is decomposed and the film is foamed. At this time, the compression roll is compressed only by the weight of the roll, and thus, foaming may be sufficiently performed.

In this foaming process, the foaming agent of the pre-mixed polymer film is decomposed in the second heating zone within the temperature range at which the foaming agent is decomposed, and the polymer film is foamed between the metal plates. In the present disclosure, the foaming pore generation method adopts a method of uniformly mixing a foaming agent with a polymer resin in a chemical foaming method in a thermoplastic polymer resin, and then foaming with gas generated by decomposing the foaming agent at a certain temperature.

Finally, in the present disclosure, the laminate in which the foamed pores are formed is cooled to room temperature. After the foaming process of the foamed resin film described above, when passing through the cooling zone, the temperature is room temperature, and the product is manufactured by adjusting the gap of the compression roll according to the required thickness of the product. Typically, 100% to 300% of the thickness of the film before foaming is determined to be optimal for maintaining vibration-damping performance and strength as a damping steel sheet.

Figure 2:
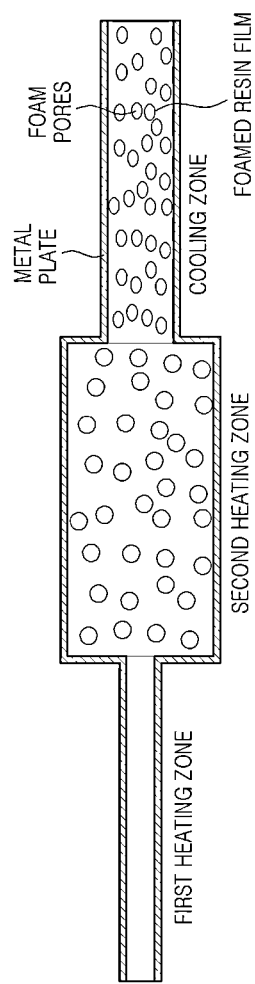
FIG. 2 is a schematic cross-sectional view illustrating a cross section of a metal plate for each manufacturing process of a damping steel plate according to the present disclosure.

FIG. 2 is a cross-sectional schematic view illustrating a cross section of a damping metal sheet for each manufacturing process of a damping steel sheet according to the present disclosure.

On the other hand, in the present disclosure, it is preferable to manage the line speed at 0.5 to 5 m/min per minute in the above-described continuous manufacturing process of the damping metal sheet. If the speed is less than 0.5 m/min, productivity may decrease, and if exceeding 5 m/min, it may be difficult to form foam pores in the polyethylene resin layer.

Mode for Invention

Hereinafter, the present disclosure will be described in detail through examples.

EXAMPLE

After melting a polyethylene resin having a number average molecular weight of 8000 to 12000 at 140° C., stearic acid was mixed therein in the range of 0.1 to 1% by weight. Then, 1-5% of Styrene-ethylene-butadiene-styrene (SEBS) resin was mixed, followed by mixing azodicarbonamide, a powder foaming agent, and ZnO, a foaming aid, in an amount of 0.5-2% and finally adding dicumyl peroxide as a crosslinking agent in the range of 1 to 4% to be mixed uniformly to prepare a foamed resin composition. At this time, the foaming resin compositions were respectively prepared by varying the content of the foaming agent as illustrated in Tables 3-4 below. Then, a foamed resin film having a thickness of 100 μm was prepared by using the blended resin composition through a t-die of an extruder.

Then, the foamed resin film prepared as described above was inserted and laminated between 0.5T galvanized steel sheets, and then, the laminate was roll-pressed while passing through the first heating zone maintained at a temperature of 130 to 150° C., to be bonded to each other. Thereafter, by passing the roll-bonded laminate through the second heating zone maintained at a temperature of 150 to 190° C., a foaming agent was foamed to form foamed pores in the foamed resin film. Finally, the laminate with the foamed pores was cooled to room temperature, thereby manufacturing a final constrained-type vibration-damping steel sheet.

For each damping steel sheet manufactured in this manner, the foaming performance of the foamed film according to the foaming agent content was evaluated, and the results are illustrated in Table 4 below.

In addition, the loss factor according to the content of the foaming agent was measured and the value is illustrated in 5 below. The damping performance is a quantity that indicates the ability to convert vibration energy into thermal energy when vibrations are applied to a material. A loss factor (η), which has the same meaning as internal friction, is used as an indicated quantity of the damping performance. In this case, the loss factor η is defined by the following relational expression 1 when the total vibration energy of the vibration system is E and the energy dissipated by converting into thermal energy during 1 cycle vibrations is ΔE.

$$\eta = \Delta E / 2\pi E \ (\eta \leq 1) \quad \text{[Relational Expression 1]}$$

Figure 3:
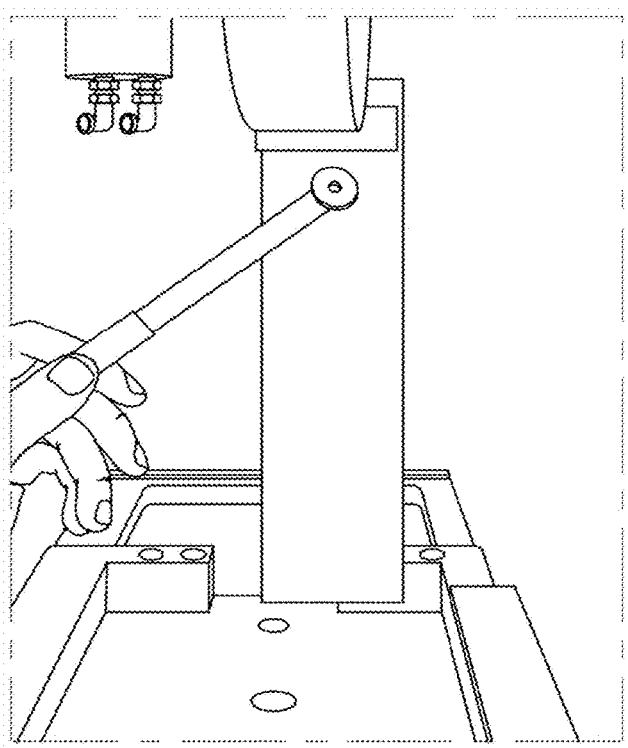
FIG. 3 is a diagram illustrating a modal evaluation method for measuring vibration damping performance.
Figure 3:
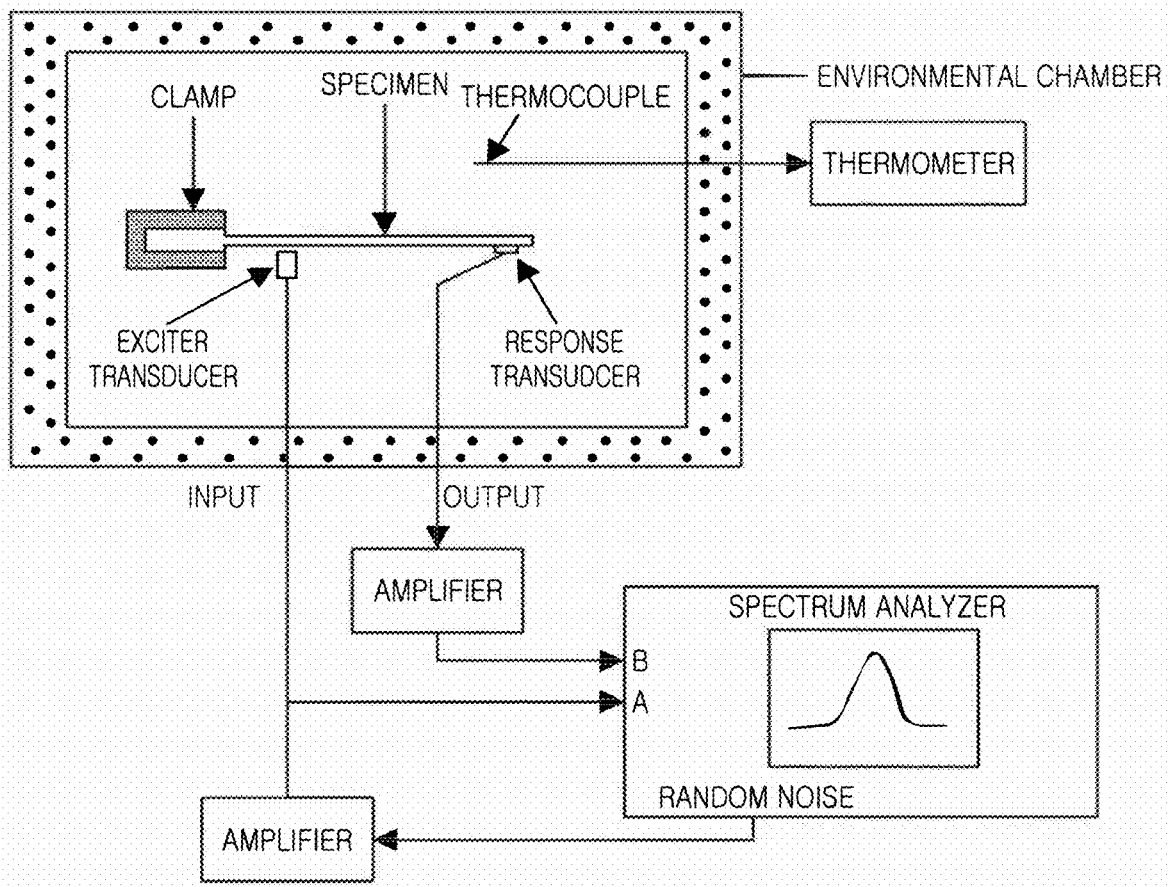

On the other hand, as a loss factor measurement method, the modal evaluation method of FIG. 3 was used, and the modal evaluation method is an impact test method using a hammer on a test piece as a form of vibration test, and is a method to measure the damping performance by measuring the loss factor using the characteristics of vibrations generated after impact on the specimen. For reference, the higher the value of the loss factor is, the better the damping performance is.

In addition, the machinability of the damping steel sheet was judged by visually observing whether or not the resin layer and the galvanized steel sheet were peeled off and maintained in the 90° shape during 90° bending of each manufactured damping steel sheet, and the results are illustrated in Table 5 below. On the other hand, at this time, the judgment criteria were determined by dividing into good (no peeling, 90° shape retention), normal (no peeling, insufficient 90° shape retention), and poor (peeling).

TABLE 4

| | Foaming agent content (wt %) | | | | | |
|---|---|---|---|---|---|---|
| Classification | 0.09 | 1 | 3 | 5 | 7 | 10 | 12 |
| Foaming rate(%) | Less than 50 | 50 | 200 | 300 | 500 | 700 | 1000 |

TABLE 5

| | Foaming agent content (wt %) | | | | | | | |
|---|---|---|---|---|---|---|---|---|
| | 0 | 0.09 | 1 | 3 | 5 | 7 | 10 | 12 |
| Loss factor | 0.02 | 0.025 | 0.03 | 0.03 | 0.035 | 0.034 | 0.041 | 0.045 |
| Machinability | Good | Good | Good | Good | Good | Normal | Normal | Normal |

As illustrated in Tables 4-5 above, in the case of damping steel sheets in which a foamed resin film satisfying 0.1 to 5% of the foaming agent component of the present disclosure is bonded between galvanized steel sheets, it can be seen that all thereof not only have foaming ratios in an appropriate range (50 to 300%), but also have large loss factor values and excellent machinability. Meanwhile, when the content of the foaming agent is less than 0.1%, the foaming rate is insufficient, and when it exceeds 5%, it can be seen that the machinability is not good.

As described above, the detailed description of the present disclosure has been described with respect to the preferred embodiments of the present disclosure, but those skilled in the art to which the present disclosure belongs may make various modifications without departing from the scope of the present disclosure, of course. Therefore, the scope of the present disclosure should not be limited to and defined as the described embodiments, and should be defined by not only the claims described later, but also those equivalent thereto.

The invention claimed is:

1. A constrained vibration-damping metal sheet having foam pores, comprising:
    a lower metal plate;
    a foamed resin film bonded to the lower metal plate; and
    an upper metal plate bonded to the foamed resin film,
    wherein the foamed resin film includes, by wt % of itself, 85-95% of a thermoplastic polyethylene resin having a number average molecular weight of 8000-12000, 0.1-1% of stearic acid, 1-5% of a styrene-ethylene-butadiene-styrene (SEBS) resin, 0.5-5% of a foaming agent, 1-4% of a dicumyl peroxide crosslinking agent, and 0.5-2% of ZnO foaming aid, and
    wherein a thickness of the foamed resin film ranges from 50 to 250 μm.

2. The constrained vibration-damping metal sheet having foam pores of claim 1,
    wherein the foaming agent is an azodicarbonamide-based powder foaming agent.

3. The constrained vibration-damping metal sheet having foam pores of claim 1,
    wherein the foaming agent is a capsule foaming agent containing a foaming agent in a thermoplastic acrylonitrile-based resin cell structure.

4. The constrained vibration-damping metal sheet having foam pores of claim 1,
    wherein the metal sheet is one selected from a cold-rolled steel sheet, a hot-rolled steel sheet, a galvanized steel sheet, a zinc alloy coated steel sheet, a stainless steel sheet and an aluminum sheet.

\* \* \* \* \*